July 8, 1952  N. C. BREMER  2,602,344
GUIDE LINK FOR SILENT CHAINS
Filed May 19, 1950
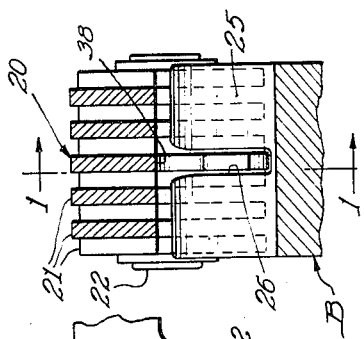
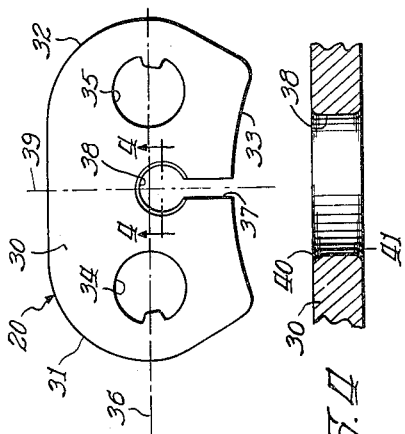
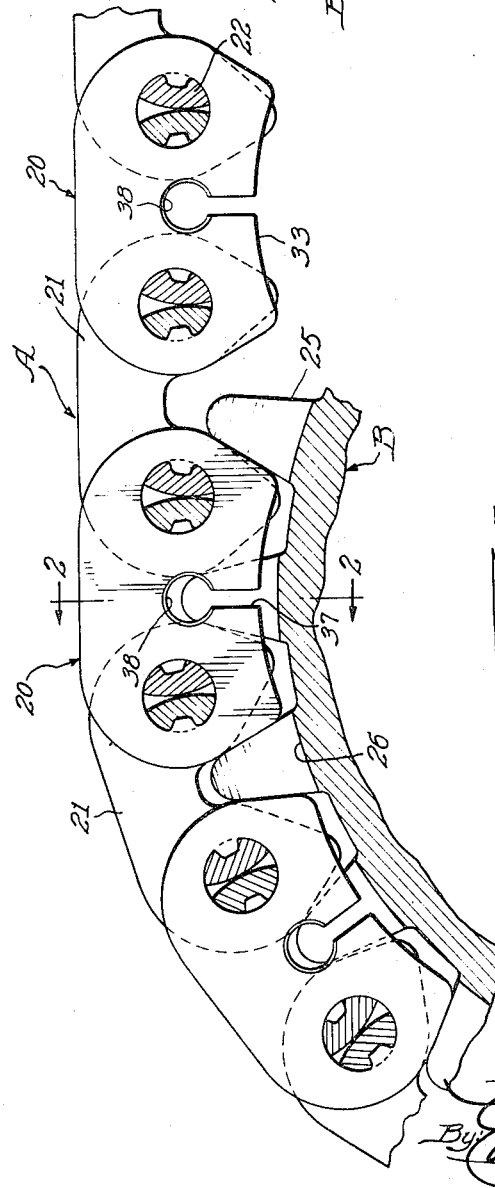
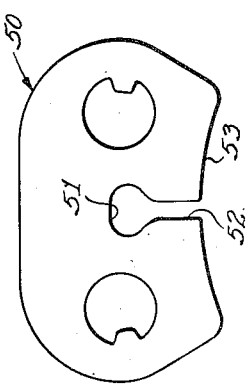
Inventor:
Norman C. Bremer Patented July 8, 1952

2,602,344

UNITED STATES PATENT OFFICE 2,602,344

GUIDE LINK FOR SILENT CHAINS

Norman C. Bremer, Ithaca, N. Y., assignor to Morse Chain Company, Ithaca, N. Y., a corporation of New York Application May 19, 1950, Serial No. 163,051

6 Claims. (Cl. 74—250)

This invention relates in general to a chain construction and has particular reference to an improved guide link for an inverted tooth silent type transmission chain.

In the type of transmission chain contemplated by this invention, the chain is held in alignment on the sprockets either by a center link or links which fit into a guide groove in the sprocket or by links on the outside of the chain which do not contain the toothed construction, thereby shrouding the sprocket face to keep the chain in a proper transverse position on the sprocket.

It is notable that when a silent chain is transmitting its rated power, a relatively substantial deflection takes place in each individual link of the chain because of the pulling load. In order that each link in the chain will take its proper share of the load, it has been found to be important that every link should have, as nearly as possible, the same load deflection properties. Because of the toothed or arched construction of the regular links in the chain, considerable deformation occurs in the "crotch" of the links.

Heretofore, in prior art constructions the usual type of chain was of solid construction and the only appreciable deflection or extension of the link could take place around the aperture areas with very little deflection or extension of the link taking place in the center portion. Because of this, less deflection for a given load will occur in the guide link of such prior art constructions and consequently with a given load applied to the chain assembly the guide link or links would be forced to carry a higher proportionate share of the load.

The aforementioned condition has been found to be objectionable and dangerous, but because it is customary to design chain assemblies of the character contemplated herein to carry loads just within the fatigue limits of the material and very careful balance must be maintained in distribution of stress otherwise failure due to fatigue cracks will occur.

As a matter of fact and well known to engineers experienced in this field, considerable trouble has been experienced because of the failure of the guide links due to the fact that they do not extend or "stretch" as much as the other links of the chain under a given load.

Another objectionable feature of the usual type of guide is that the pins of the chain, because of their relatively slender construction, are liable to be stressed beyond their safe limits unless every link in the chain carries the same load, thus distributing the shear loads across the pin evenly.

It is recognized that in the prior art numerous attempts have been made to provide a balanced chain construction, but to the best of the applicant's knowledge, only very few of the prior art structures have had limited successful applications and have been accorded only limited commercial recognition. It is believed that this fact results from the deficiencies of the prior art structures, and their non-adaptability to effectively overcome the deficiencies hereinbefore set forth.

The present improvements in silent chain constructions contemplated herein are directed to simplify the structural features thereof and their mode of operation and to provide a guide link for a silent chain which may readily and conveniently be employed universally in silent chain drive assemblies presently being commercially exploited.

It is, therefore, a general object and accomplishment of the invention to provide a silent chain construction having incorporated therein a guide link adaptable to compensate for deflection or extension of the adjacent conventional links due to substantial power load and the like, thereby to provide a balanced chain construction and thus distribute the shear loads across the chain pins evenly.

It is a more detailed object and accomplishment of the invention to provide in a silent chain construction a guide link having a crotch extending from the peripheral edge of the lower portion of the chain and disposed between the pin apertures and opening from an aperture of larger diameter than the width of the crotch, said aperture being provided with chamfered surfaces around the peripheral edge thereof, the arrangement being particularly characterized in providing a chain link adaptable to flexibility to compensate for deflection or extension of associated and adjacent conventional links, thus to distribute the shear loads across the chain pin evenly.

The invention seeks, as a further object and accomplishment, to provide a chain construction having incorporated therein a guide link as contemplated herein and characterized by an arrangement of parts to more advantageously and satisfactorily perform the function required of it and adapted to provide a compact unit which will successfully combine the factors of structural simplicity and durability and yet be economical to manufacture.

A further object and accomplishment of the invention is to provide a new and improved form of guide link for silent chains, which link is adapted to be economically manufactured, and which is so designed as to permit the manufacture and assembly thereof in accordance with present day large scale mass production manufacturing methods of construction and assembly.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and, as more particularly pointed out in the appended claims.

With these objects in view, together with others which will appear as the description proceeds, the invention resides in the novel construction, the combination of parts and the arrangement thereof for cooperative effort to more efficiently perform the functions required, as illustrated in the drawing and which will be more fully described hereinafter, and as more particularly pointed out in the appended claims, reference being had to the accompanying drawing which forms a part of this specification, wherein:

Fig. 1 is a sectional view of a silent chain drive construction incorporating therein a guide link embodying the features of the present invention, the section being taken substantially on the plane of the line 1—1 in Fig. 2;

Fig. 2 is a sectional view of the chain construction depicted in Fig. 1 and being taken substantially on the plane of the line 2—2 in Fig. 1;

Fig. 3 is a side elevational view of a guide link embodying the features of the present invention;

Fig. 4 is a fragmentary sectional view of the guide link depicted in Fig. 3 and being taken substantially on the plane of the line 4—4 in Fig. 3; and Fig. 5 is a slightly modified form of guide link embodying the features of the present invention.

The drawings are to be understood to be more or less of a schematic character for the purpose of illustrating and disclosing typical or preferred forms of the improvements contemplated herein and in the drawings like reference characters identify the same parts in the several views.

As one possible example of advantageous employment of the guide link contemplated by this invention, reference is made to the drawings, particularly Fig. 1, wherein there is illustrated the guide link with which the present invention is particularly concerned and generally indicated at each instance by the numeral 20 as being incorporated in a silent chain construction indicated in its entirety by the letter A, and shown in its normal operative position while running over a conventional chain sprocket designated in its entirety by the letter B, said silent chain A being comprised of a plurality of conventional chain links generally indicated at each instance by the numeral 21, said chain A being held in its assembled position by rocker type chain pins generally indicated at each instance by the numeral 22.

The conventional silent chain sprocket B may comprise a plurality of teeth as at 25 and an annular groove 26 disposed centrally of the sprocket and running transversely of the direction of the teeth 25.

Suffice it to say, since the invention is not particularly concerned with the precise construction of the entire silent chain as illustrated, and/or its associated parts, they will not be further described in detail, and it is deemed sufficient for all intentions and purposes herein contained to show only portions thereof adjacent to and cooperating with the guide link contemplated herein. It is to be understood that details of construction of such silent chains with which the guide link contemplated herein may advantageously be employed and/or their associated parts, may be modified to suit particular conditions or to satisfy the engineering genius of various manufacturers, and I do not wish to be limited to the construction of these elements as set forth except where such construction particularly concerns the invention contemplated herein.

Having thus described, by way of example, a possible adaptation of the guide link and the related silent chain construction, and having generally described the environment surrounding the adaptation, the specific construction and cooperative functions of the parts of the silent chain and the guide link with which the present invention is particularly concerned, will now be described in detail.

In the exemplary embodiment of the invention depicted in Figs. 1, 2 and 3, the chain guide link 20 contemplated by the instant invention comprises, in general, a substantially elongated body 30 with curved end surfaces 31 and 32 preferably corresponding to the curved end surfaces of the associated chain links 21 and with the bottom surface 33 thereof formed to define an arch, a pair of chain pin receiving apertures 34 and 35 disposed in spaced relationship with their axes substantially on the horizontal center line 36 of the chain guide link, said chain guide link being particularly characterized in the provision of a slot 37 opening into and extending upwardly from the arched surface 33 and terminating in an aperture 38 of substantially larger diameter than the width of the slot 37 and with the axis thereof disposed on the vertical center line 39 of the guide link but below the horizontal center line 36.

In addition to the important aforementioned characterizing feature of the invention, the invention contemplates the provision of chamfered surfaces or radii 40 and 41 respectively disposed to follow the peripheral edges of the aperture where said aperture opens at each side of the guide link. Exhaustive experiments have proven that the removal of the sharp edges or corners at the periphery of the aperture 38 by the provision of the chamfered surfaces or radii 40 and 41 results in the distribution of the load more uniformly throughout the aperture resulting in longer fatigue life. These tests have also proven that fatigue cracks usually start at a sharp edge which have been proven to act as stress raisers and result in premature fatigue failure in the chain. It is important to understand, however, that the slot and aperture contemplated by this invention without the radii 40 and 41 effectively provides increased life to the guide link but the inclusion of the radii 40 and 41 further increases the life of the guide link.

Fabrication of a chain link by blanking, punching, shaving and coining necessarily leaves sharp corners and torn metal at high stressed locations resulting in stress concentration and the reliability of these parts under dynamic loading may be improved by decreasing the hardness below that required for best tensile strength, but it is desirable to keep the hardness up to standard requirements and, therefore, it has been found necessary to minimize stress raisers. The present invention effectively overcomes this problem by providing the slot and aperture arrangement and coupling therewith the radii 40 and 41 at the peripheral edges of the aperture 38.

Adverting to Fig. 5 wherein there is disclosed a modified chain link generally indicated by the numeral 50 and which is of the same general construction as disclosed with respect to the chain link shown in Fig. 3 with the one important exception that the aperture 51 is not circular in shape but provides an elongated curved surface opening into slot 52 which extends downwardly from the aperture 51 and opens into the arched surface 53 of the guide link 50.

In order that each link in the chain will take its proper share of the load, it has been found important that every link should have, as nearly as possible, the same load deflection properties. This carries out the well known maxim that a chain is no stronger than its weakest link.

Because of the toothed or arched construction of the regular links in the chain, considerable deformation under load occurs in the "crotch" of the links. In accordance with the principles of the instant invention, the guide links provide a proper balance to the entire chain so that each link in the chain will properly perform its share of the load, thus distributing the shear loads across the chain pins evenly.

From the foregoing disclosure, it may be observed that I have provided an improved guide link for silent chains which efficiently fulfills the objects there as hereinbefore set forth and which provides numerous advantages which may be summarized as follows:

1. Structurally simple, efficient and durable;
2. Economical to manufacture and readily adaptable to mass production manufacturing principles; and
3. The provision of a guide link adaptable to compensate for deflection or extension of the adjacent conventional links due to substantial power load and the like, thereby to provide a balanced chain construction and thus distribute the shear loads across the chain pins evenly.

While I have illustrated preferred embodiments of my invention, many modifications may be made without departing from the spirit of the invention, and I do not wish to be limited to the precise details of construction set forth, but wish to avail myself of all changes within the scope of the appended claims.

I claim:

1. A chain drive comprising a plurality of chain links respectively interconnected by chain pins, a plurality of guide links respectively interposed between said chain links and each having the bottom surface thereof formed to define an arch and each having a pair of chain pin receiving openings disposed in spaced relationship with their axes substantially on the horizontal center line of the guide link, and each having a slot opening into and extending upwardly from the arched surface and terminating in an aperture of substantially larger diameter than the width of the slot and with the axis thereof disposed on the vertical center line of the guide link and said aperture having the peripheral edges thereof at each side of said guide link formed with a radius, whereby said guide links will have load bearing characteristics balanced with the load bearing characteristics of said chain links, thereby to distribute evenly the load across the chain pins.

2. In a chain drive comprising a plurality of chain links respectively interconnected by chain pins, a chain guide link interposed between said chain links and comprising a substantially elongated body with the bottom surface thereof formed to define an arch, said body having a pair of chain receiving apertures disposed in spaced relationship with the axes substantially on the horizontal center line of the guide links and having a slot opening into and extending upwardly from the arched surface and terminating in an aperture of substantially larger diameter than the width of the slot and with the axis thereof disposed on the vertical center line of the guide link but below the horizontal center line, whereby said guide link will have load bearing characteristics balanced with the load bearing characteristics of said chain links, thereby to distribute evenly the load across the chain pins.

3. In a chain guide link, the combination with a substantially elongated body with the bottom surface thereof formed to define an arch and having a pair of chain pin receiving openings disposed in spaced relationship with their axes substantially on the horizontal center line of the guide link, of a slot opening into and extending upwardly from the arched surface and terminating in an aperture of substantially larger diameter than the width of the slot and with the axis thereof disposed on the vertical center line of the guide link but below the horizontal center line, and said aperture having the peripheral edges thereof at each side of said guide link formed to define a radius.

4. In a chain guide link with the bottom surface thereof formed to define an arch, a slot extending upwardly from the arched surface and terminating in an aperture of substantially larger diameter than the width of the slot and with the axis thereof disposed on the vertical center line of the guide link, and said aperture having the peripheral edges thereof at each side of said guide link formed to define a radius.

5. A chain drive comprising a plurality of chain links respectively interconnected by chain pins, a plurality of guide links respectively interposed between said chain links and each comprising an elongated body with the bottom surface thereof formed to define an arch and having a pair of chain pin receiving openings disposed in spaced relationship with their axes substantially on the horizontal center line of the guide link, and a slot opening into and extending upwardly from the arched surface and terminating in an aperture of substantially larger diameter than the width of the slot and with the axis thereof disposed on the vertical center line of the guide link but below the horizontal center line, whereby said guide links will have load bearing characteristics balanced with the load bearing characteristics of said chain links, thereby to evenly distribute the load across the chain pins.

6. A chain guide link comprising an elongated body with the bottom surface thereof formed to define an arch, said body having a pair of chain receiving apertures disposed in spaced relationship with their axes substantially on the horizontal center line of the guide link, and a slot opening into and extending upwardly from the arched surface and terminating in an aperture of substantially larger diameter than the width of the slot and with the axis thereof disposed on the vertical center line of the guide link but below the horizontal center line.

NORMAN C. BREMER.

REFERENCES CITED

The following references are of record in the file of this patent:

UNITED STATES PATENTS

| Number | Name | Date |
|---|---|---|
| 2,036,216 | Johnson | Apr. 7, 1936 |

FOREIGN PATENTS

| Number | Country | Date |
|---|---|---|
| 30,007 | Great Britain | 1896 |